(12) United States Patent  
Bayer et al.

(10) Patent No.: US 9,401,638 B2
(45) Date of Patent: Jul. 26, 2016

(54) SYSTEM AND METHOD FOR SINGLE PHASE TRANSITION FOR MULTIPHASE DCDC CONVERTERS

(71) Applicant: Texas Instruments Deutschland GmbH, Freising (DE)

(72) Inventors: Erich Bayer, Thonhausen (DE); Joerg Kirchner, Mauem (DE); Michael Lueders, Munich (DE)

(73) Assignee: TEXAS INSTRUMENTS DEUTSCHLAND GMBH, Freising (DE)

( * ) Notice: Subject to any disclaimer, the term of this patent is extended or adjusted under 35 U.S.C. 154(b) by 0 days.

(21) Appl. No.: 14/517,721

(22) Filed: Oct. 17, 2014

(65) Prior Publication Data

US 2015/0256067 A1   Sep. 10, 2015

Related U.S. Application Data

(60) Provisional application No. 61/948,344, filed on Mar. 5, 2014.

(51) Int. Cl.
| | |
|---|---|
| *H02M 1/00* | (2006.01) |
| *H02M 3/158* | (2006.01) |
| *H02M 3/156* | (2006.01) |
| *H02M 1/08* | (2006.01) |
| *G06F 1/26* | (2006.01) |
| *H02J 1/10* | (2006.01) |

(52) U.S. Cl.
CPC ............. *H02M 3/156* (2013.01); *G06F 1/26* (2013.01); *H02M 1/08* (2013.01); *H02M 3/1584* (2013.01); *H02J 1/102* (2013.01)

(58) Field of Classification Search
CPC ............ H02M 2001/0045; H02M 3/1584; H02M 3/1582; H02M 1/08; H02M 3/156

USPC .................. 323/268, 269, 271, 272
See application file for complete search history.

(56) References Cited

U.S. PATENT DOCUMENTS

| | | | | |
|---|---|---|---|---|
| 6,979,982 | B2 * | 12/2005 | Herbert | H02M 3/1584 323/272 |
| 8,970,195 | B2 * | 3/2015 | Zambetti | H02M 3/1584 323/283 |
| 9,106,201 | B1 * | 8/2015 | Chakraborty | |
| 2008/0122478 | A1 * | 5/2008 | Mei | G11C 7/04 327/27 |
| 2008/0272752 | A1 * | 11/2008 | Qiu | H02M 3/1584 323/272 |
| 2008/0310200 | A1 * | 12/2008 | Maksimovic | H02M 3/1584 363/65 |
| 2010/0085024 | A1 * | 4/2010 | Houston | H02M 3/1584 323/281 |

(Continued)

*Primary Examiner* — Timothy J Dole
*Assistant Examiner* — Sisay G Tiku
(74) *Attorney, Agent, or Firm* — William B. Kempler; Frank D. Cimino

(57) ABSTRACT

A DCDC converter includes a controller, an up/down counter, a first power stage and a second power stage. The controller generates an up/down control signal. The up/down counter generates a first power stage control signal and a second power stage control signal based on the up/down control signal. The first power stage generates a first output current at a first phase and at a first voltage based on the first power stage control signal. The second power stage generates a second output current at a second phase based on the second power stage control signal. The up/down counter modifies the first power stage control signal to control the first power stage such that the first output current attenuates from a first power stage output to a secondary first power stage output. The controller can further output a control signal to modify the first voltage of the first power stage.

14 Claims, 7 Drawing Sheets

(56) References Cited

U.S. PATENT DOCUMENTS

2010/0141230 A1 * 6/2010 Lukic .................. H02M 3/1584 323/283

2012/0176105 A1 * 7/2012 Chang .................. H02M 3/1584 323/237

* cited by examiner

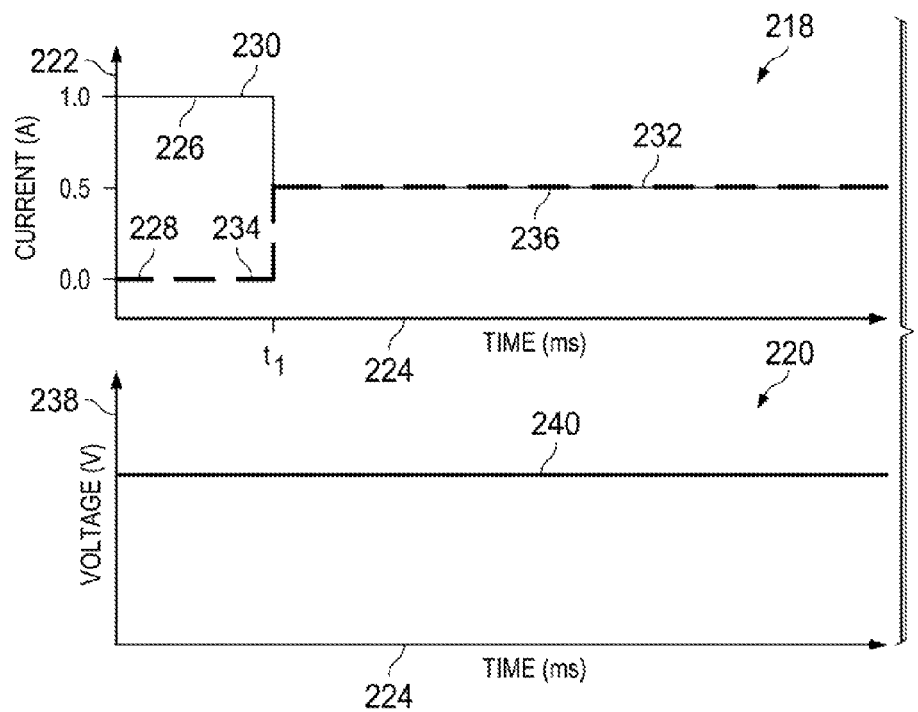
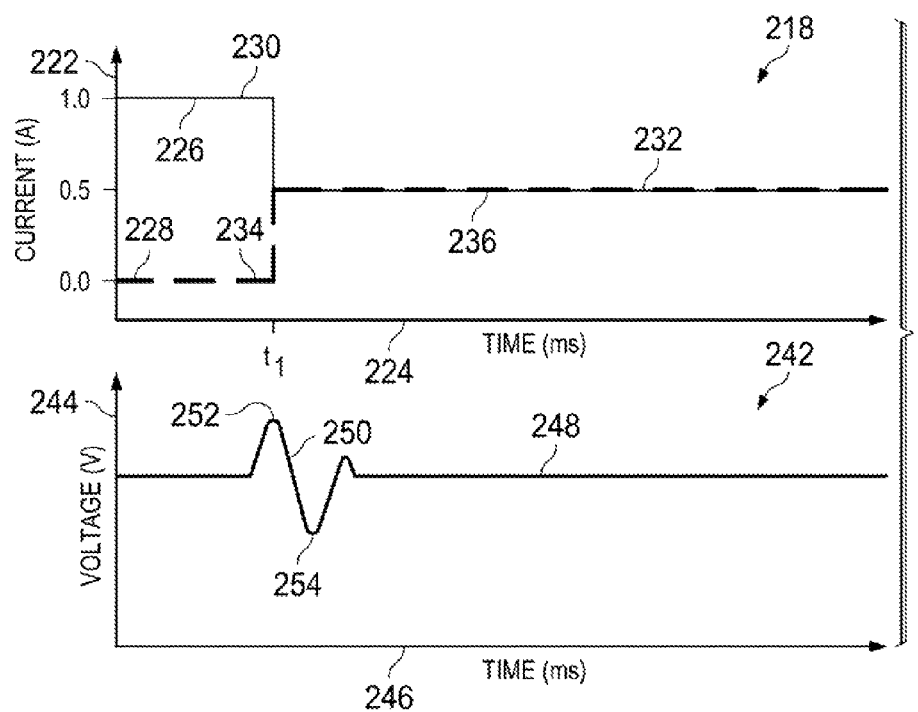

SYSTEM AND METHOD FOR SINGLE PHASE TRANSITION FOR MULTIPHASE DCDC CONVERTERS

The present application claims priority from: U.S. Provisional Application No. 61/948,344 filed Mar. 5, 2014, the entire disclosure of which is incorporated herein by reference.

BACKGROUND

DC to DC converters are important in portable electronic devices such as cellular phones and laptop computers and are supplied with power from batteries. Such electronic devices often contain several sub-circuits each with its own voltage level requirement different from that supplied by the battery or an external supply (sometimes higher or lower than the supply voltage). A battery's voltage, for example, declines as its stored power is drained. Switched DC to DC converters offer a method to increase voltage from a partially lowered battery voltage thereby saving space instead of using multiple batteries to accomplish the same thing.

Electronic switch-mode DC to DC converters transform one DC voltage level to another, by storing the input energy temporarily and then releasing that energy to the output at a different voltage. The storage may be in either magnetic field storage components (inductors, transformers) or electric field storage components (capacitors).

FIG. 1 illustrates a block diagram of a conventional DC-DC converter 100.

As illustrated in the figure, DC-DC converter 100 contains a controller 102, a power source 104, a power stage 106, a power stage 108, and a load 110.

Controller 102 is in communication with power stage 106 via a line 112 and is in communication with power stage 108 via as line 114. Power source 104 is in communication with power stage 106 and power stage 108 via a line 116. Power stage 106 and power stage 108 are in communication with controller 102 and load 110 via a line 118.

Controller 102 controls power stage 106 with a control signal 120, via line 112, and controls power stage 108 with a control signal 122, via line 114. Power source 104 delivers a DC current 124 to power stage 106 and power stage 108, via line 116.

Power stage 106 generates a power signal 126, based on control signal 120. Power signal 126 has an associated voltage and current. For purposes of discussion, let the maximum voltage generated by power stage 106 be a constant voltage, whereas the current generated by power stage 106 may be varied in response to control signal 120 so as to vary the resultant power signal 126. In this manner, when power signal 126 changes, it changes based on a change in the associated current.

Power stage 108 generates a power signal 128, based on control signal 122. Power signal 128 has an associated voltage and current. For purposes of discussion, let the maximum voltage that may be generated by power stage 108 be a constant voltage that is, at most, equal to the voltage generated by power stage 106, whereas the current generated by power stage 108 may be varied in response to control signal 122 so as to vary the resultant power signal 128. In this manner, when power signal 128 changes, it changes based on a change in the associated current.

Power signal 126 adds to power signal 128 to make load power 130, which is provided to load 110 and to controller 102. For purposes of discussion, let each of power stage 106 and power stage 108 be able to deliver a maximum current of 1.0 A at 3.0 V to load 110. For example, let power stage 106 and power stage 108 provide, ideally, a fixed voltage via an output inductor (not shown). However, as the impedance of an inductor is based on the frequency of the alternating current conducted there through, the actual output voltage may vary.

The operation of DC-DC converter 100 will now be discussed with additional reference to FIGS. 2A-C.

FIG. 2A illustrates load power 130 DC-DC converter 100.

The figure includes a graph 202 and a graph 204. Graph 202 includes a Y-axis 206, an X-axis 208, a current function 210 and a current function 212. Graph 204 includes a Y-axis 214, X-axis 208 and a voltage function 216.

Graph 202 represents the current of load power 130 over time in DC-DC converter 100, whereas graph 204 of load power 130 represents the voltage over time in DC-DC converter 100. Y-axis 206 represents current in Amperes, whereas Y-axis 214 represents voltage in Volts. X-axis 206 represents time in ms.

Current function 210 corresponds to power signal 126 of power stage 106, as shown in FIG. 1, over time. Current function 212 corresponds to power signal 128 of power stage 108, as shown in FIG. 1, over time. In this example, power signal 128 is zero, so power signal 126 is equal to load power 130, as shown in FIG. 1. As such, in this example current function 210 additionally corresponds to load power 130 over time. Current functions 210 and 212 are each illustrated as a direct current (DC) to simplify the discussion. In should be noted that each function may be additionally described with an alternating current (AC).

Voltage function 210 corresponds to a voltage associated with load power 130, as shown in FIG. 1, over time.

In FIG. 2A, as shown by current function 210, power stage 106 is outputting power signal 126 at 1.0 A. Simultaneously, as shown by current function 212, power stage 108 is not outputting any current. When only power stage 106 is outputting current 116 to load 110, DC-DC converter 100 is in single phase mode.

Returning to FIG. 1, in operation, controller 102 determines the voltage and current to be provided to load 110. In this non-limiting example, controller 102 determines 1.0 A of single phase current at 3.0 V should be generated.

Controller 102 compares the determined current to be provided to load 110 with load power 130. Since neither of power stage 106 or power stage 108 is currently operating, load power 130 is lower than the determined current.

Controller 102 then activates power stage 106, via control signal 120, to output the correct current. Power stage 106 converts power from power source 104 into power at 1.0 A and 3.0 V, and transmitting it to load 110 as power signal 126. Power stage 106 solely transmitting power to load 110 is represented by current function 210 and voltage function 216 of FIG. 2A. DC-DC converter 100 continues to operate in this single phase state.

For purposes of discussion, DC-DC converter 100 now desire to provide output power 1.0 A of dual phase current at a voltage of 3V. Non-limiting examples of why the current and voltage requirements may include a user input, based on time, or change in power load. For purposes of discussion, in this example embodiment let the change in current requirements of DC-DC converter 100 be due to a request from a user. The request may come due to a reduction or increase in load, change in operating environment, or based on timing procedures.

With at a new phase of current needed, controller 102 compares the current (associated with the required new phase of current) with the current state of load power 130. Controller 102 determines that transmitting power in dual phase mode is required. The ideal switching from single phase to dual phase power modes of DC-DC converter 100 will now be further discussed with additional reference to FIG. 2B.

FIG. 2B includes a graph 218 and a graph 220 of load power 130 of DC-DC converter 100, when ideally switching from a single phase to a dual phase output. Graph 218 includes a Y-axis 222, an X-axis 224, a current function 226 and a current function 228. Current function 226 includes a portion 230 and a portion 232. Current function 228 includes a portion 234 and a portion 236. Graph 220 includes a Y-axis 238, X-axis 224 and a voltage function 240.

Graph 218 represents the current of load power 130 over time in DC-DC converter 100, whereas graph 220 represents the voltage of load power 130 over time in DC-DC converter 100. Y-axis 222 represents current in Amperes, whereas Y-axis 232 represents voltage in Volts. X-axis 224 represents time in seconds.

Current function 226 corresponds to power signal 126 of power stage 106, as shown in FIG. 1. Portion 230 has a current of 1.0 A and continues up to a time $t_1$, whereas portion 232 has a current of 0.5 A and starts after time $t_1$. Current function 228 corresponds to power signal 128 of power stage 108, as shown in FIG. 1. Portion 234 has a current of 0.0 A and continues up to time $t_1$, whereas portion 236 has a current of 0.5 A and starts after time $t_1$.

In this example, power signal 128 is zero up to time $t_1$, so power signal 126 is equal to load power 130 up to time $t_1$. As such, in this example, power signal 126 additionally corresponds to load power 130 up to time $t_1$. Because load power 130 is the sum of power signal 126 and power signal 128, up to time $t_1$, load power 130 has an associated current of 1.0 A, but is solely provided from power signal 126. On the other hand, after time $t_1$, load power 130 has an associated current that remains 1.0 A, but includes 0.5 A from power signal 126 and 0.5 A from power signal 128. In this example, as both power stage 106 and power stage 108 are providing current after time $t_1$, DC-DC converter 100 is operating in a dual phase mode after time $t_1$.

Similar to FIG. 2A, in FIG. 2B, current functions 226 and 228 are each illustrated as a direct current (DC) to simplify the discussion. In should be noted that each function may be additionally described with an alternating current (AC).

Voltage function 240 corresponds to a voltage associated with load power 130, as shown in FIG. 1, over time.

Returning to FIG. 1, after determining that load power 130 needs to be transmitted in dual phase mode, at time $t_1$, controller 102 sends control signal 120 to power stage 106 and sends control signal 122 to power stage 108. Since power stage 106 is already providing power at 1.0 A and 3.0 V, its power will need to be decreased to 0.5 A and 3.0 V. Simultaneously, power stage 108 will need to be activated and then begin transmitting power to load 110 at 0.5 A and 3.0 V. The power output by power stage 106 and power stage 108 is reflected in current functions 226 and 228 of FIG. 2B. The ideal voltage output is represent by voltage function 240 of FIG. 2B.

In an ideal system, the voltage output to load 110 would remain constant, even when transitioning from a single phase current output to a two phase current output, as shown by voltage function 240 of FIG. 2B. In practice though, the voltage output to load 110 does vary, and sometimes significantly. The voltage of power signal 126 may develop transients due to nonlinearities in the power transfer function of power stage 106, e.g., voltages of impedance components that are a function of frequency. Similarly, the voltage of power signal 128 may develop transients due to nonlinearities in the power transfer function of power stage 108. Due to the nonlinearities in the system, the voltage transients cannot be predicted and must be compensated for after they occur by a feedback loop. There are even minor transients and nonlinearities in the feedback loop itself.

The realistic voltage output when switching from single phase to dual phase power modes of DC-DC converter 100 will now be further discussed with additional reference to FIG. 2C.

FIG. 2C includes graph 218 and a graph 242 of load power 130 of DC-DC converter 100, when switching from a single phase to a dual phase output. Graph 242 includes a Y-axis 244, X-axis 224 and a voltage function 248.

Voltage function 240 corresponds to a voltage of load power 130, as shown in FIG. 1, over time. Voltage function 248 includes a transient 250, which includes a voltage overshoot 252 and a voltage undershoot 254. Transient 250 represents a voltage change when switching power transfer modes at time $t_1$.

Returning to FIG. 1, when controller 102 instructs each of power stage 106 and power stage 108 to enter the new power transfer mode, they move from a first steady state to a second steady state. When moving from a steady state there is a voltage overshoot due to the nonlinearities of the respective transfer functions of power stage 106 and power stage 108.

For example, for purposes of discussion, presume that in a single phase operation, controller 102 outputs control signal 120 to instruct power stage 106 to output 3.0 W, and outputs control signal 122 to instruct power stage 108 to output 0.0 W. Further, let power stage 106 output 3.0 W as power signal 126 as 3.0 V at 1.0 A. Then, presume that in a dual phase operation, controller 102 outputs control signal 120 to instruct power stage 106 output 1.5 W, and outputs control signal 122 to instruct power stage 108 to output 1.5 W.

Ideally, and for purposes of discussion, suppose power stage 106 should output 1.5 W as power signal 126 as 3.0 V at 0.5 A and power stage 108 should output 1.5 W as power signal 128 as 3.0 V at 0.5 A. However, presume that power stage 106 actually, yet incorrectly, outputs 3.2 V at 0.5 A, wherein the error in the voltage is due to nonlinearities in the transfer function of power stage 106. Such a voltage overshoot corresponds to voltage overshoot 252 of FIG. 2C. In other words, even though the instructions from controller 102 may be correct, the actually produced voltage, and therefore power, from each power stage may be incorrect.

If this were to happen, power signal 126 provided by power stage 106 would be 1.6 W, power signal 128 provided by power stage 108 would be 1.5 W and load power 130 would be 3.1 W. More importantly, the voltage overshoot may damage devices in load 110.

Further, voltage overshoot 252 will generate a change in load power 130, which is detected by controller 102 via line 118. Controller 102 will compare load power 130 with a reference power to determine whether the output of power stage 106 and/or the output of power stage 108 needs to be modified. In this case, as a result of voltage overshoot 252, controller may instruct power stage 106, via control signal 120, to modify its output voltage and/or may instruct power stage 108, via control signal 122, to modify its output voltage. However, the original correction may lead to voltage undershoot 254. Again, controller 102 will compare load power 130 with a reference power to determine whether the output of power stage 106 and/or the output of power stage 108 needs to be modified. In this case, as a result of voltage undershoot 254, controller may instruct power stage 106, via control signal 120, to modify its output voltage and/or may instruct power stage 108, via control signal 122, to modify its output voltage. This feedback loop continues until transient 250 attenuates to an acceptable level. Eventually, controller 102 may instruct power stage 106 and power stage 108 to output the correct power. Due to the limited bandwidth of the feedback loop between power stage 106, power stage 108, and controller 102, the current and voltage adjustment of load power 130 may take a relatively long time.

In the example of FIG. 2C, controller 102 manages to compensate for transient 254 and reach a steady state when outputting 1.0 V at 3.0 V at 14 ms on X-axis 246.

Now, for purposes of discussion, suppose controller 102 again requires a single phase current output.

Controller 102 compares the voltage and current associated the required single phase current output to the voltage and current of load power 130, and again determines that the voltage and current of load power 130 are not correct. Controller 102 determines that load power 130 needs to be transmitted in a single phase at 1.0 A and 3.0 V. The ideal switching from dual phase to single phase power modes of DC-DC converter 100 will now be further discussed with additional reference to FIG. 2D.

FIG. 2D includes a graph 256 and a graph 258 of load power 130 of DC-DC converter 100, when ideally switching from a dual phase to a single phase output. Graph 256 includes a Y-axis 260, an X-axis 262, a current function 264 and a current function 266. Current function 264 includes a portion 268 and a portion 270. Current function 266 includes a portion 272 and a portion 274. Graph 258 includes a Y-axis 276, X-axis 262 and a voltage function 278.

Graph 256 represents the current of load power 130 over time in DC-DC converter 100, whereas graph 258 represents the voltage of load power 130 over time in DC-DC converter 100. Y-axis 260 represents current in Amperes, whereas Y-axis 276 represents voltage in Volts. X-axis 262 represents time in seconds.

Current function 264 corresponds to power signal 126 of power stage 106, as shown in FIG. 1. Portion 268 has a current of 0.5 A and continues up to a time $t_2$, whereas portion 270 has a current of 1.0 A and starts after time $t_2$. Current function 266 corresponds to power signal 128 of power stage 108, as shown in FIG. 1. Portion 272 has a current of 0.5 A and continues up to time $t_2$, whereas portion 274 has zero current after time $t_1$.

In this example, up to time $t_2$, load power 130 has an associated current of 1.0 A, but includes 0.5 A from power signal 126 and 0.5 A from power signal 128. As both power stage 106 and power stage 108 are providing current up to time $t_2$, DC-DC converter 100 is operating in a dual phase mode up to time $t_2$. On the other hand, after time $t_2$, power signal 128 is zero, so power signal 126 is equal to load power 130 after time $t_2$. As such, in this example, portion 270 additionally corresponds to load power 130 after time $t_2$. Because load power 130 is the sum of power signal 126 and power signal 128, after time $t_2$, load power 130 has an associated current of 1.0 A, but is solely provided from power signal 126.

Similar to FIGS. 2A-B, current functions 264 and 266 are each illustrated as a direct current (DC) to simplify the discussion. In should be noted that each function may be additionally described with an alternating current (AC).

Voltage function 278 corresponds to a voltage of load power 130, as shown in FIG. 1, over time.

Returning to FIG. 1, after determining that load power 130 needs to be transmitted in a single phase mode, at time $t_2$, controller 102 sends control signal 120 to power stage 106 and sends control signal 122 to power stage 108. Since power stage 106 is providing power at 0.5 A and 3.0 V, its power will need to be increased to 1.0 A and 3.0 V. Simultaneously, power stage 108 will need to be deactivated. The power output by power stage 106 and power stage 108 is reflected in current functions 264 and 266 of FIG. 2D. The ideal voltage output is represent by voltage function 278 of FIG. 2D.

In an ideal system, the voltage output to load 110 would remain constant, even when transitioning from a dual phase current output to a single phase current output, as shown by voltage function 278 of FIG. 2D. In practice though, the voltage of power signal 126 may develop transients as discussed above.

The realistic switching from single phase to dual phase power modes of DC-DC converter 100 will now be further discussed with additional reference to FIG. 2E.

FIG. 2E includes graph 256 and a graph 280 of an output of DC-DC converter 100, when switching from a dual phase to a single phase output. Graph 280 includes a Y-axis 282, X-axis 262 and a voltage function 284.

Voltage function 284 corresponds to a voltage of load power 130, as shown in FIG. 1, over time. Voltage function 284 includes a transient 286, which includes a voltage overshoot 288 and a voltage undershoot 290. Transient 286 represents a voltage change when switching power transfer modes at time $t_2$.

Similar to the situation discussed above with reference to FIG. 2C, here, the nonlinearities in power stage 106 and/or power stage 108 create transients in the output voltage that may be so large (in amplitude) that they risk damaging load 110.

A problem with the conventional system and method for utilizing DC-DC converters is that a transient voltage is created in the output during the transition from two different transfer modes (e.g. the transition from single phase to dual phase or dual phase to single phase operation). The error in the output voltage must be corrected for by a regulation loop. The error in the voltage output takes a relatively long time to correct due to the limited bandwidth of the regulation loop.

What is needed is a system and method for switching between two different transfer modes that minimizes transients in the output voltage of the DC-DC converter.

BRIEF SUMMARY

The present invention provides a system and method system and method for switching between two different transfer modes while minimizing transients in the output voltage of the DC-DC converter.

In accordance with aspects of the present invention, a DCDC converter includes a controller, an up/down counter, a first power stage and a second power stage. The controller generates an up/down control signal. The up/down counter generates a first power stage control signal and a second power stage control signal based on the up/down control signal. The first power stage generates a first output current at a first phase and at a first voltage based on the first power stage control signal. The second power stage generates a second output current at a second phase based on the second power stage control signal. The up/down counter modifies the first power stage control signal to control the first power stage such that the first output current attenuates from a first power stage output to a secondary first power stage output. The controller can further output a control signal to modify the first voltage of the first power.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate example embodiments of the present invention and, together with the description, serve to explain the principles of the invention. In the drawings:

FIGS. 2A-E illustrate a graphs of voltage and current in a DC-DC converter switching between single and dual phase modes of operation;

DETAILED DESCRIPTION

Figure 1:
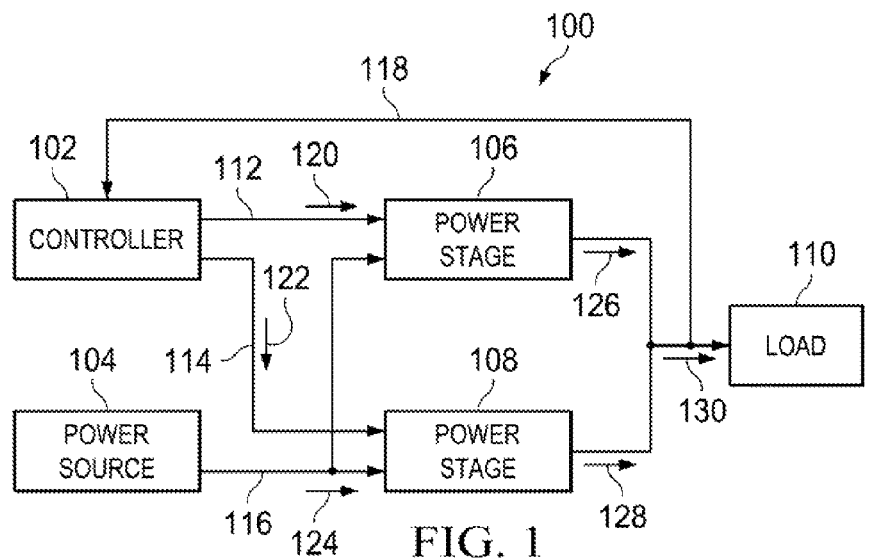
FIG. 1 illustrates a conventional DC-DC converter.

The present invention provides a system and method for switching between two different transfer modes of a DC-DC converter, while minimizing a transient in the output voltage.

In accordance with an aspect of the present invention, a DC-DC converter is operable to provide single phase or dual phase power at a constant voltage using two power stages. In single phase mode, an up/down counter is used to turn one power stage on and the second power stage off. In dual phase mode, the up/down counter will turn on the second power stage and increase its current output while concurrently decreasing the current output of the first stage in order to keep the combined current output of both power stages constant.

The current associated with the output power of one power stage is step-wise increased, whereas the current associated with the output power of another power stage is concurrently and equally step-wise decreased. In other words, the outputs of the two power stages are inversely changed. In this manner, the up/down counter controls only the distribution of the total current provided by each power stage. When switching from single phase mode to dual phase mode or vice versa, each step-wise change in the current of each power stage creates a transient in the voltage of the combined output of both power stages.

A controller is used to further control the output of each of the power stages. The controller uses a feedback loop to monitor the voltage of the combined output of the power stages. The controller can then adjust the voltage output of both power stages in order to keep the voltage of the combined output constant. In this manner, the controller can compensate for the voltage transient during the transition between power transfer modes.

In accordance with another aspect of the present invention, the period of the steps from the up/down counter may be varied. Increasing or decreasing the period of the steps from the up/down counter varies the amount of time the controller has to regulate the voltage of the power stages and compensate for the transient created by the change in current output of each power stage.

In accordance with another aspect of the present invention, the magnitude of steps from the up/down counter may be varied. Increasing or decreasing the magnitude of the steps from the up/down counter varies the size of the transient for which the controller needs to compensate.

In accordance with another aspect of the present invention, both the magnitude and period of the steps from the up/down counter may be varied. Increasing both the magnitude and period of the steps will increase the size of the voltage transient created. Since the period is also increased, the controller has more time to compensate for the larger transient. Decreasing both the magnitude and period of the steps will decrease the amount of time the controller has to compensate for the transient created. But since there was also a smaller change in current, there is a small transient created, which requires less time to compensate for by the controller.

In accordance with another aspect of the present invention, the DC-DC converter creates a smooth transition between transfer modes by using a Digital-to-Analog Converter (DAC) in the control path of each output power stage. The DACs are controlled by a digital up/down counter, which gradually increases/decreases the current provided by the power stage via the control signal. For example, consider the situation where a DC-DC converter is changing from dual phase mode to single phase mode.

In a master/slave configuration, a master power stage has unidirectional control over a slave power stage, wherein the actions of the master power stage control the actions of the slave power stage. For example, if the master power stage is increasing its current output, the slave power stage is simultaneously decreasing its power output. If the master power stage is decreasing its current output, simultaneously the slave power stage will be increasing its current output.

In this manner the total output of the DC-DC converter is kept constant over time. Multiple DACs may be implemented to individually attenuate or amplify current of each output power stage. In an example embodiment, the transfer function of a DAC can be described by the following equation:

$$I_{Out} = I_{In} * (1 + (k*X)) \quad (1)$$

In equation (1), X represents the control value of the digital up/down counter that is within the range of 0<X<1. In equation (1), k represents the sensitivity of the DAC and is in the range of −1<k<1. For a dual phase DC-DC converter, the value of k of the master phase is positive, and the k value of the slave phase is negative.

Since the full transition process between two different transfer modes may take place within a few ms, the voltage regulation loop of DC-DC converter in accordance with aspects of the present invention has sufficient time to compensate for small errors or non-linearity's in transfer functions of the power stages. In some embodiments, at the end of the transition from dual phase mode to single phase mode, the slave power stage may outputting power at a minimum current, $I_{Minimum}$. Due to $I_{Minimum}$ being output, there is little impact on the output voltage of the DC-DC converter when the slave power stage is switched off. As the slave power stage is turned off, the master power stage is outputting power at the required current, $I_{Required}$.

Switching from single phase mode to dual phase mode means running the slave power stage in reverse. As the slave power stage gradually increases its current for its corresponding output power, the master power stage gradually decreases its current for its corresponding output power. At the end of the transition, the master and slave power stages may provide equal power.

There are many types of DC-DC converters in use today in the electronics industry. The buck-boost converter for example, is a type of DC to DC converter that has an output voltage magnitude that is either greater than or less than the input voltage magnitude. The operation of the buck-boost is best understood in terms of the inductor's "reluctance" to allow rapid change in current. From the initial state in which there is no charge and the circuit is open, the current through an inductor is zero. When the circuit becomes closed, a blocking diode forces current to flow through the inductor. However, since the inductor prevents rapid current change, it will initially keep the current low by dropping most of the voltage provided by the source. Over time, the inductor allows the current to slowly increase by decreasing its voltage drop.

Inventive aspects of the present invention are applicable to the many types of DC-DC converters, including buck-boost converters. Non-limiting types of DC-DC converters include step down (buck), step up (boost), buck-boost, linear, hard switched, resonant, continuous, and discontinuous converters.

Example systems in accordance with aspects of the present invention will now be described with reference to FIGS. 3-10. A first example embodiment will be described with reference to FIGS. 3-6.

Figure 3:
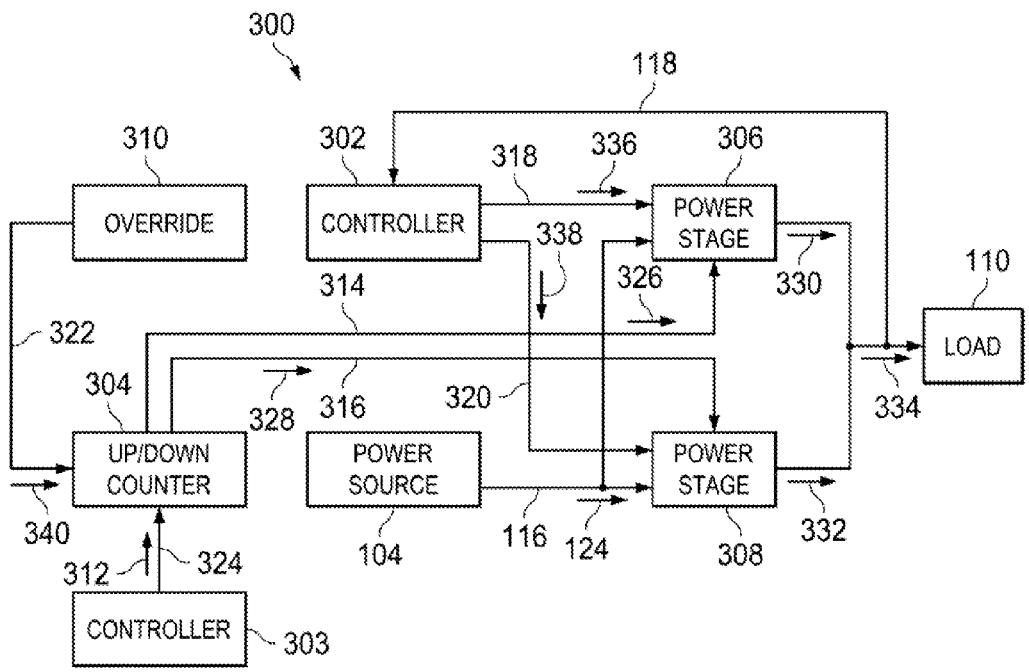
FIG. 3 illustrates an example DC-DC converter in accordance with aspects of the present invention.

FIG. 3 illustrates an example DC-DC converter 300 in accordance with aspects of the present invention.

As illustrated in the figure, DC-DC converter 300 includes a controller 302, a controller 303, a digital up/down counter 304, power source 104, a power stage 306, a power stage 308, an override component 310 and load 110.

In this example, controller 302, controller 303, up/down counter 304, power stage 306, power stage 308, power source 104, override component 310 and load 110 are illustrated as individual devices. However, in some embodiments, at least two of controller 302, controller 303, up/down counter 304, power stage 306, power stage 308, power source 104, override component 310 and load 110 may be combined as a unitary device.

Controller 302 is in communication with power stage 306 and power stage 308 via a line 318.

Controller 303 is in communication with up/down counter 304 via a line 312.

Up-down counter 304 is in further communication with power stage 306 via a line 314 and is in further communication with power stage 308 via a line 316.

Power source 104 is in communication with power stage 306 and power stage 308 via line 116. Power stage 306 and power stage 308 are in further communication with controller 302 and load 110 via line 118.

Override component 310 is in communication with up/down counter 304 via a line 322.

Controller 302 controls power stage 306 and power stage 308 with a control signal 336, via line 318. Controller 303 controls up/down counter 304 with a control signal 324, via line 312. Power source 104 delivers DC current 124 to power stage 306 and power stage 308, via line 116.

Up/down counter 304 controls power stage 306 with a control signal 326, via line 314, and controls power stage 308 with a control signal 328, via line 316.

Power stage 306 generates a power signal 330, based on control signal 326 and control signal 336. Load power 334 has an associated voltage and current. For purposes of discussion, let the maximum voltage generated by power stage 306 be a constant voltage, whereas the current generated by power stage 306 may be varied in response to control signal 326 and control signal 336 so as to vary the resultant power signal 330. In this manner, when power signal 330 changes, it changes based on a change in the associated current.

Power stage 308 generates a power signal 332, based on control signal 328 and control signal 336. Power signal 332 has an associated voltage and current. For purposes of discussion, let the maximum voltage that may be generated by power stage 308 be a constant voltage that is, at the most, equal to the voltage generated by power stage 306, whereas the current generated by power stage 308 may be varied in response to control signal 328 and control signal 336 so as to vary the resultant power signal 332. In this manner, when power signal 332 changes, it changes based on a change in the associated current.

Power signal 330 adds to load power 334 to make load power 334, which is provided to load 110 and to controller 302. For purposes of discussion, let each of power stage 306 and power stage 308 be able to deliver a maximum current of 1.0 A at 3.0 V to load 110. For example, let power stage 306 and power stage 308 provide, ideally, a fixed voltage via an output inductor (not shown). However, as the impedance of an inductor is based on the frequency of the alternating current conducted there through, the actual output voltage may vary.

Override component generates an override signal 340 to up/down counter 304.

The operation of DC-DC converter 300 will now be discussed with additional reference to FIG. 4.

Figure 4:
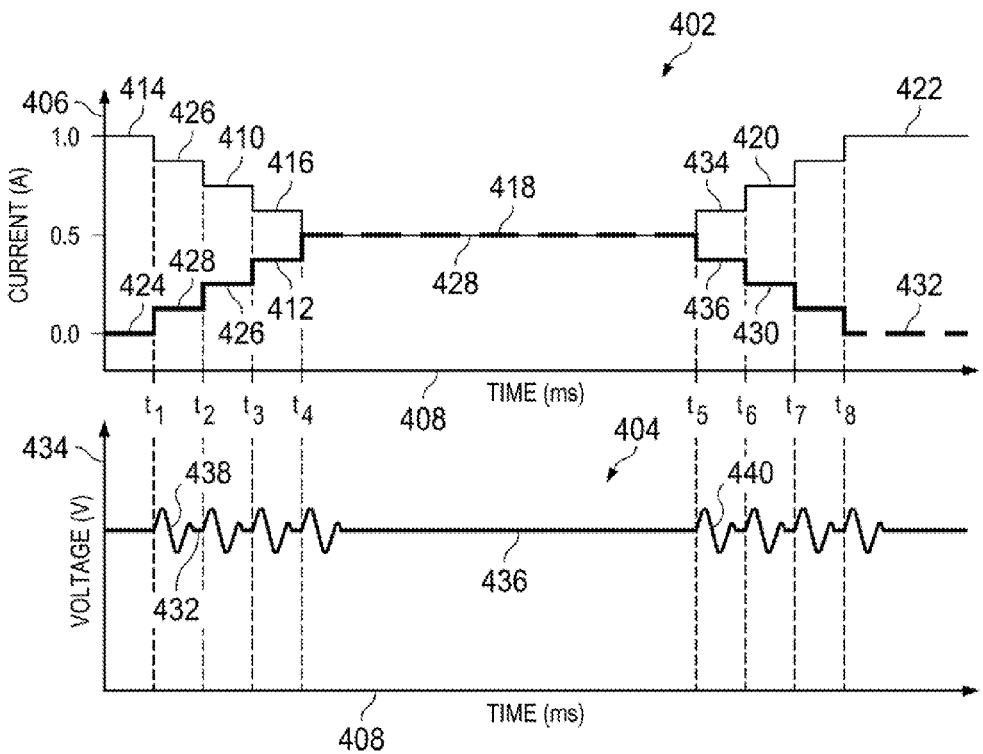
FIG. 4 illustrates graphs of voltage and current in an example DC-DC converter switching between single and dual phase modes of operation accordance with aspects of the present invention.

FIG. 4 includes graph 402 and a graph 404 of load power 334 of DC-DC converter 300, when switching from a single phase output to a dual phase output and then back to a single phase output. Graph 402 includes a Y-axis 406, an X-axis 408, a current function 410 and a current function 412. Current function 410 includes a single phase portion 414, a decreasing portion 416, a dual phase portion 418, an increasing portion 420, and a single phase portion 422. Current function 412 includes a single phase portion 424, a decreasing portion 426, a dual phase portion 428, an increasing portion 430, and a single phase portion 432. Graph 404 includes a Y-axis 434, X-axis 408 and a voltage function 436.

Graph 402 represents the current of load power 334 over time in DC-DC converter 300, whereas graph 404 represents the voltage of load power 334 over time in DC-DC converter 300. Y-axis 406 represents current in Amperes, whereas Y-axis 434 represents voltage in Volts. X-axis 408 represents time in seconds.

Current function 410 corresponds to power signal 330 of power stage 306, as shown in FIG. 3. Single phase portion 414 has a current of 1.0 A, and continues up to a time $t_1$. Decreasing portion 416 is a stepped function that decreases in four increments from 1.0 A to 0.5 A at times $t_1$-$t_4$. Dual phase portion 418 has a current of 0.5 A and continues between times $t_4$ and $t_5$. Increasing portion 420 is a stepped function that increases in four increments from 0.5 A to 1.0 A at times $t_5$-$t_8$. Single phase portion 422 has a current of 1.0 A and continues after time $t_8$.

Current function 412 corresponds to power signal 332 of power stage 308, as shown in FIG. 3. Single phase portion 424 has a current of 0.0 A, and continues up to time $t_1$. Increasing portion 426 is a stepped function that increases in four increments from 0.0 A to 0.5 A at times $t_1$-$t_4$. Dual phase portion 428 has a current of 0.5 A and continues between times $t_4$ and $t_5$. Decreasing portion 430 is a stepped function that decreases in four increments from 0.5 A to 0.0 A at times $t_5$-$t_8$. Single phase portion 432 has a current of 0.0 A and continues after time $t_8$.

Voltage function 436 corresponds to a voltage of load power 334, as shown in FIG. 3, over time. Voltage function 436 includes a plurality of transients, a sample of which are labeled transient 438 and transient 440. Transient 438 represents a voltage change when switching power transfer modes at time $t_1$, whereas transient 440 represents a voltage change when switching power transfer modes at time $t_5$.

Returning to FIG. 3, for purposes of discussion, let DC-DC converter 300 be operating in a single phase output mode, wherein power stage 306 is outputting 1.0 A at 3.0 V. This is reflected in FIG. 4 at single phase portion 414 of current function 410 and single phase portion 424 of current function 412.

Then, let controller 303 determine that DC-DC converter 300 should operate in a dual phase output mode. As such, controller 303 instructs up/down counter 304, via control signal 324 to initiate the mode switching. With additional reference to FIG. 4, at time $t_1$, up/down counter 304 instructs power stage 306, via control signal 326 to decrease its output current, and concurrently instructs power stage 308, via control signal 328 to increase its output current. Up/down counter 304 continues to count "steps" in instructions such that the output current for power stage 306 stepwise decreases and such that the output current for power stage 308 stepwise increases until each are outputting in a dual phase mode. This is reflected in FIG. 4 at decreasing portion 416 of current function 410 and increasing portion 426 of current function 412.

Figure 2A:
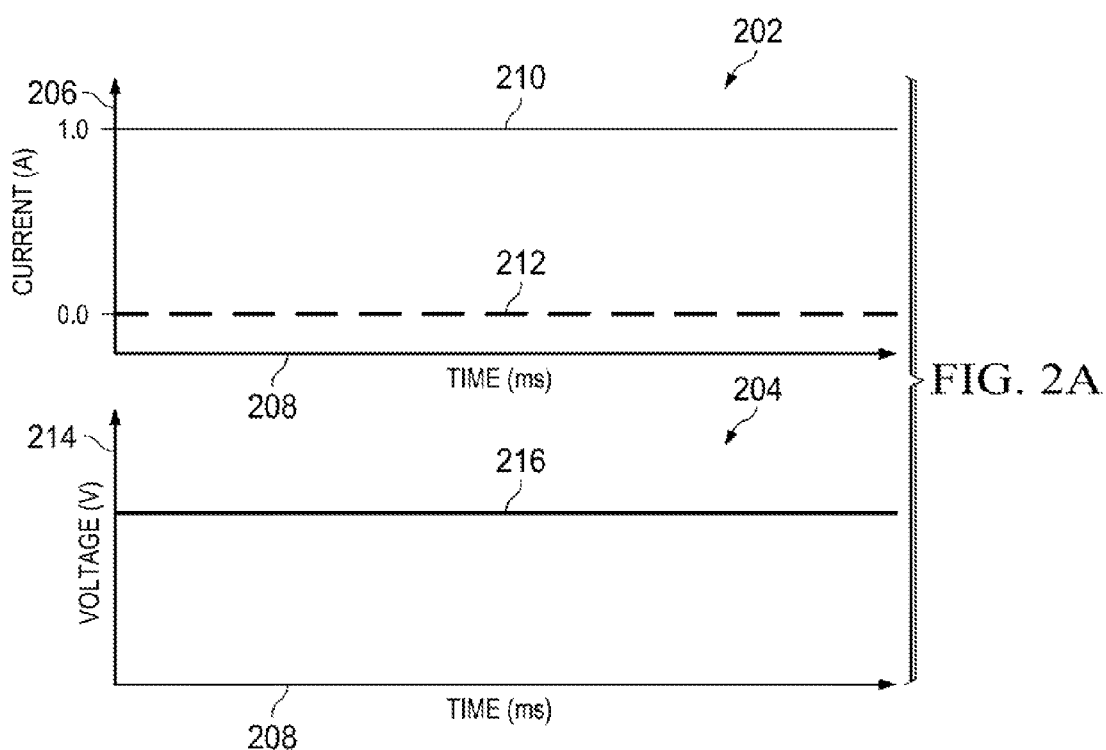
Figure 2D:
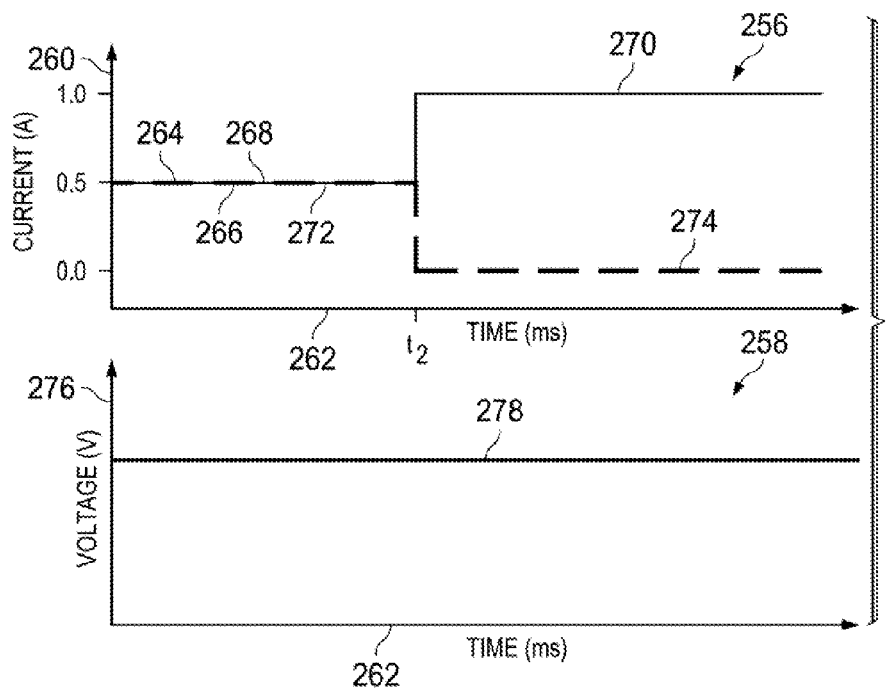
Figure 2E:
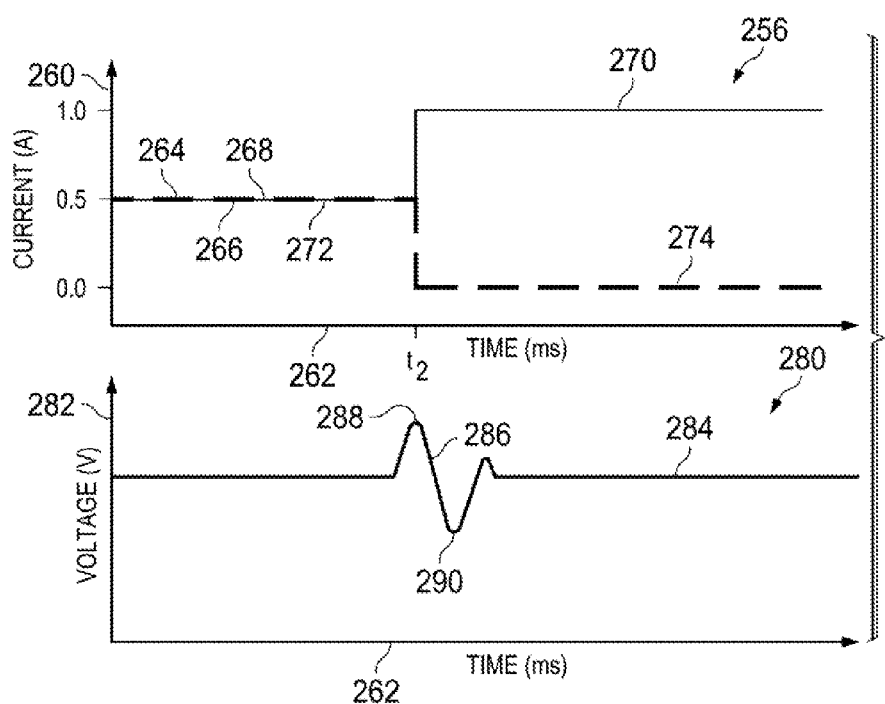

As discussed above, with reference to FIGS. 2C and 2E, when changing between output states there may be a voltage overshoot (or undershoot) due to the nonlinearities of the respective transfer functions of the power stages. In accordance with the present invention, the series of incremental steps decreases the magnitude of the voltage transients. For example, as shown in FIG. 4, transient 438, which is associated with the incremental stepwise decrease in output current of power stage 306 as shown in current function 410, and which is associated with the incremental stepwise increase in output current of power stage 308 as shown in current function 412, is much smaller than transient 250 of FIG. 2C. Accordingly, in accordance with the present invention, the incremental stepwise change between output states of a DC-DC converter drastically decreases the magnitude of voltage transients, which drastically decreases the chance of damaging components of load 110.

Further, transient 438 will generate a change in load power 334, which is detected by controller 302 via line 118. Controller 302 will compare load power 334 with a reference power to determine whether the output of power stage 306 and power stage 308 needs to be modified. In this case, as a result of transient 438, controller may instruct power stage 306 and power stage 308, via control signal 336, to modify their output voltage. This feedback loop continues until transient 438 attenuates to an acceptable level as shown by smooth portion 432 of voltage function 436.

In this example, DC-DC converter 300 is operable to switch from a single phase output mode to a dual phase output mode in a time defined by the difference of $t_4$-$t_1$. This may be a larger amount of time for switching between output mode as compared to DC-DC converter 100 as discussed above with reference to FIG. 1 and FIG. 2C. However, as discussed above, the voltage transient magnitudes generated by DC-DC converter 300 during is multiple step, stepwise transition between two output modes are drastically smaller than the voltage transient magnitudes generated by DC-DC converter 100 during its single step transition between two output modes.

As shown in FIG. 4, controller 303 may then determine that DC-DC converter 300 should operate again in a single phase output mode. As such, controller 303 instructs up/down counter 304, via control signal 324 to initiate the mode switching. With additional reference to FIG. 4, at time $t_5$, up/down counter 304 instructs power stage 306, via control signal 326 to increase its output current, and concurrently instructs power stage 308, via control signal 328 to decrease its output current. Up/down counter 304 continues to count "steps" in instructions such that the output current for power stage 306 stepwise increases and such that the output current for power stage 308 stepwise decreases until each are outputting in a single phase mode. This is reflected in FIG. 4 at increasing portion 420 of current function 410 and increasing portion 430 of current function 412.

Just as when stepwise changing from a single phase to a dual phase output mode, when changing from a dual phase to a single phase output mode, there may be transients generated in the voltage associated with power stage 306 and/or power stage 308. These are represented in voltage function 436, for example by transient 440. Just as discussed above, controller continuously instructs power stage 306 and power stage 308 to compensate for such transients.

In other words, a DC-DC converter in accordance with aspects of the present invention is able to decrease voltage transients by stepwise changing between output phases.

Returning to FIG. 3, power stage 306 can stepwise change its output based on control signal 326 from up/down counter 304, and power stage 308 can stepwise change its output based on control signal 328 from up/down counter 304. In some embodiments, power stage 306 and power stage 308 may receive the same control signal from up/down counter 304, wherein power stage 306 will inversely stepwise change its output as compared to the stepwise change in the output of power stage 308.

Further, after a stepwise change, if needed, power stage 306 can change its output based on control signal 336 from controller 302, and power stage 308 can also change its output based on control signal 336 from controller 302.

In some embodiments, power stage 306 and power stage 308 may be combined as single power stage. This will be described with reference to FIG. 5.

Figure 5:
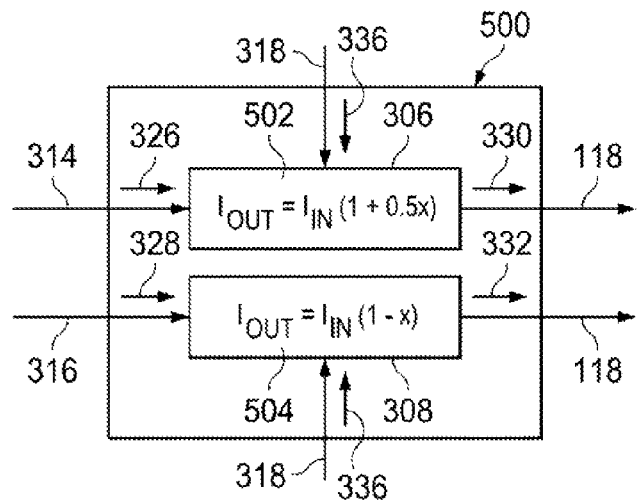
FIG. 5 illustrates an example combined power stage in accordance with aspects of the present invention.

FIG. 5 illustrates a combined power stage 500 in accordance aspects of the present invention.

As illustrated in the figure, combined power stage 500 includes power stage 306 and power stage 308.

In this example embodiment, power stage 306 provides an output current $I_{out}$ as function of the input current $I_{in}$, as shown by equation 502. Further, power stage 308 provides output current $I_{out}$ as function of the input current $I_{in}$, is shown by equation 504.

Equation 502 calculates $I_{out}$ for power signal 330, and equation 504 calculates $I_{out}$ for power signal 332. $I_{in}$ may be either directly or via some representation such as a digital value. The predetermined factor, X, is provided via decreasing (or increasing as the case may be) digital counting signal within control signal 326 and control signal 328.

Clearly, in this example, as the value of X increases, $I_{OUT}$ of equation 502 increases, whereas $I_{OUT}$ of equation 504 decreases. Similarly, as the value of X decreases, $I_{OUT}$ of equation 502 decreases whereas $I_{OUT}$ of equation 504.

There may be situations where a specific type of output phase as required by controller 303 is not desired. Override component 310 addresses such situations. For example, predetermined criteria may determine that DC-DC converter should operate in a particular output mode, e.g., single phase, when controller 303 otherwise instructs DC-DC converter to operate in a different mode, e.g., dual phase. In such situations, override component 310 may instruct up/down counter 304, via override signal 340 to output signal 326 and signal 328 to operate power stage 306 and power stage 308 in the mode corresponding to the predetermined criteria.

Figure 6:
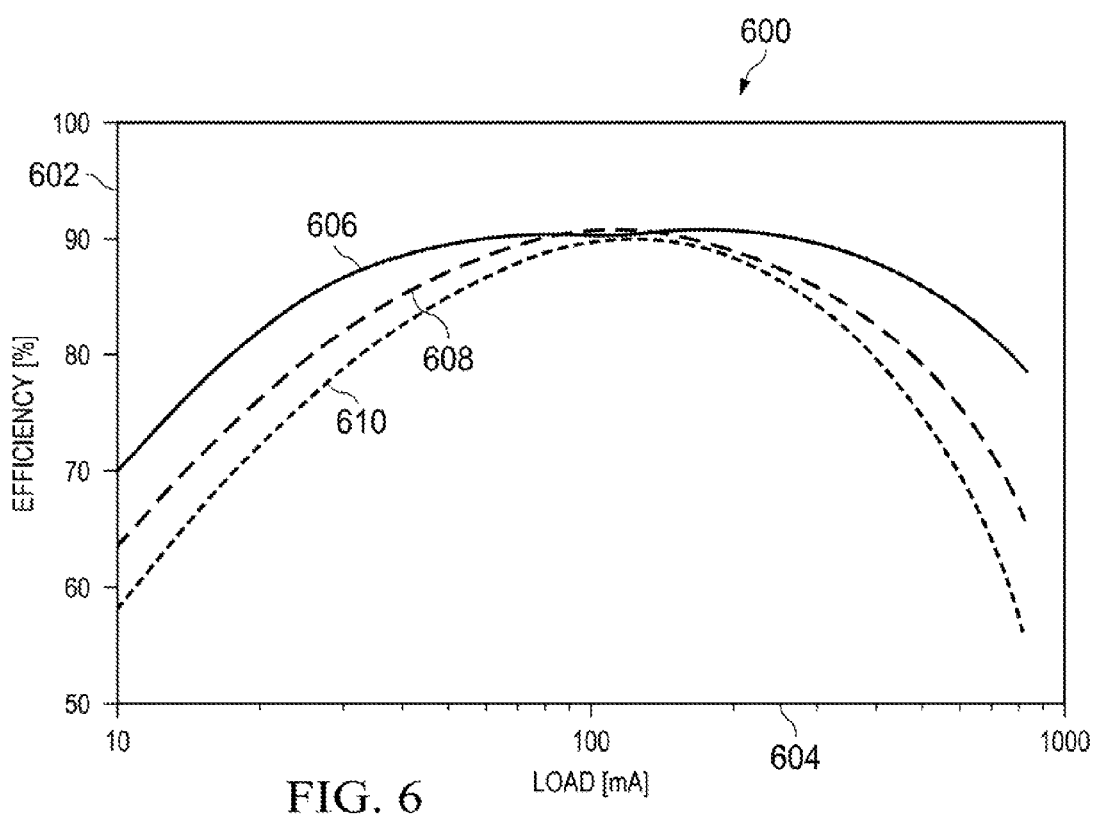
FIG. 6 illustrates a graph of efficiency as a function of load of a DC-DC converter in accordance with aspects of the present invention.

FIG. 6 illustrates a graph 600 of efficiency as a function of load of a DC-DC converter in accordance with aspects of the present invention.

As illustrated in the figure, graph 600 includes a Y-axis 602, an X-axis 604, a function 606, a function 608, and a function 610.

Y-axis 602 represents efficiency in percent. X-axis 604 represents current in mA. Function 606 represents the efficiency as a function of load for DC-DC converter 300. Function 608 represents the efficiency as a function of load for a conventional single phase DC-DC converter. Function 610 represents the efficiency as a function of load for conventional DC-DC converter 100.

A shown in the figure, DC-DC converter 300 is approximately 7% more efficient than a conventional single phase DC-DC converter, and 12% more efficient than DC-DC converter 100 at a load of 10 mA. The efficiency of each of function 606, function 608, and function 610 slowly increase to 90% as the load increases from 10 mA to 100 mA.

As the load increase from 100 mA to 1000 mA, DC-DC converter 100 loses efficiency very quickly, moving below 60% efficiency at 700 mA. The single phase DC-DC converter also loses efficiency quickly, moving below 70% at 700 mA. DC-DC converter 300 is the most efficient; at a load of 700 mA it maintains an efficiency of approximately 80%.

At 100 mA, all three DC-DC converters have approximately the same efficiency. But a DC-DC converter may be need to be used with a wide range of loads, using DC-DC converter 300 is much more efficient across a large range of loads which is much more cost effective.

In the example DC-DC converter discussed above with reference to FIGS. 3-4, up/down counter 304 stepwise changes the output of each of power stage 306 and power stage 308 over multiple steps separated by predetermined time periods described as $t_1$, $t_2$, $t_3$, etc. However, in some cases, the time period between steps should be increase to account for the time needed for controller 302 to address voltage transients. For purposes of discussion, consider the situation where controller 302 is unable to attenuate transients in the output voltages for power stage 306 and or power stage 308 between times $t_1$ and $t_2$. This will be described in greater detail with reference to FIG. 7.

Figure 7:
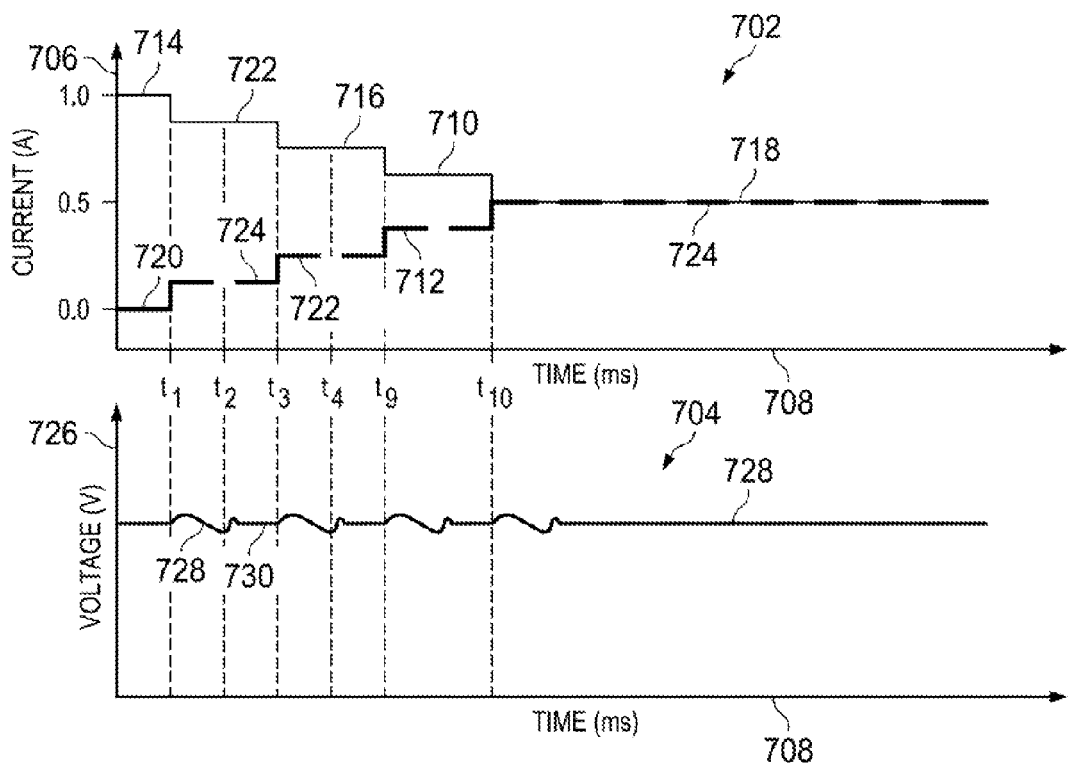
FIG. 7 illustrates additional graphs of voltage and current in an example DC-DC converter switching between single and dual phase modes of operation accordance with aspects of the present invention.

FIG. 7 includes graph 702 and a graph 704 of load power 334 of DC-DC converter 300, when switching from a single phase output to a dual phase output. Graph 702 includes a Y-axis 706, an X-axis 708, a current function 710 and a current function 712. Current function 710 includes a single phase portion 714, a decreasing portion 716 and a dual phase portion 718. Current function 712 includes a single phase portion 720, an increasing portion 722 and a dual phase portion 724. Graph 704 includes a Y-axis 726, X-axis 708 and a voltage function 728.

Graph 702 represents the current of load power 334 over time in DC-DC converter 300, whereas graph 704 represents the voltage of load power 334 over time in DC-DC converter 300. Y-axis 706 represents current in Amperes, whereas Y-axis 726 represents voltage in Volts. X-axis 708 represents time in seconds.

Current function 710 corresponds to power signal 330 of power stage 306, as shown in FIG. 3. Single phase portion 714 has a current of 1.0 A, and continues up to a time $t_1$. Decreasing portion 716 is a stepped function that decreases in four increments from 1.0 A to 0.5 A at times $t_1$-$t_{10}$. Dual phase portion 718 has a current of 0.5 A and continues after time $t_{10}$.

Current function 712 corresponds to power signal 332 of power stage 308, as shown in FIG. 3. Single phase portion 720 has a current of 1.0 A, and continues up to time $t_1$. Increasing portion 722 is a stepped function that increases in four increments from 1.0 A to 0.5 A at times $t_1$-$t_{10}$. Dual phase portion 724 has a current of 0.5 A and continues after time $t_{10}$.

Voltage function 728 corresponds to a voltage of load power 334, as shown in FIG. 3, over time. Voltage function 728 includes a plurality of transients, a sample of which is labeled transient 728. Transient 728 represents a voltage change when switching power transfer modes at time $t_1$.

In this example, transient 728 extends beyond time $t_1$. As such, up/down counter should not instruct power stage 306 and power stage 308 to further change their respective outputs until controller 302 is able to control the transient 728. In this example, as shown in the figure, transient 728 settles to an acceptable level as shown by portion 730. Therefore, decreasing portion 716 is able to decrease another step at time $t_3$ and increasing portion 722 is able to increase another step at time $t_3$.

In other words, in accordance with another aspect of the present invention, the time period between steps in the stepwise change of the output voltages of the power stages may be modified to accommodate the time needed to address voltage transients.

In the example DC-DC converter discussed above with reference to FIGS. 3-4, up/down counter 304 stepwise changes the output of each of power stage 306 and power stage 308 over four steps separated by predetermined time periods described as $t_1$, $t_2$, $t_3$, etc. These four steps were provided for purposes of discussion and do not limit embodiments o the invention. For example, in some cases, the number of steps may be increased. For purposes of discussion, consider the situation where up/down counter 304 is able to stepwise change the output voltages for power stage 306 and or power stage 308 with eight steps. This will be described in greater detail with reference to FIG. 8.

Figure 8:
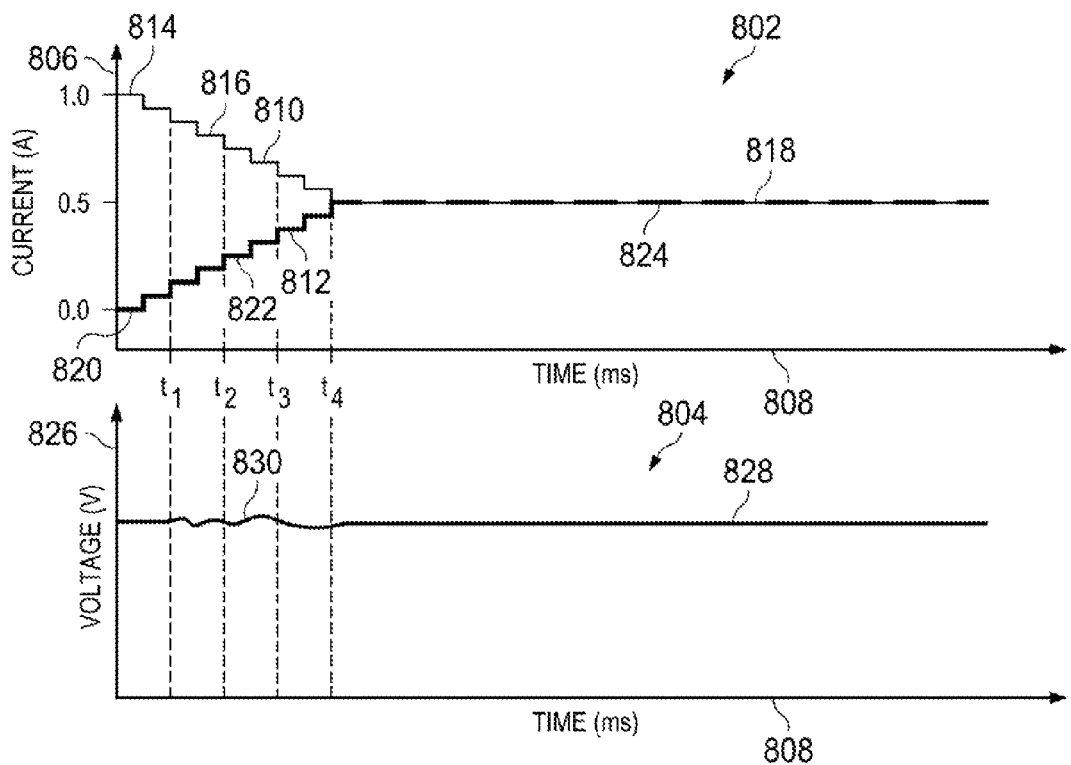
FIG. 8 illustrates additional graphs of voltage and current in an example DC-DC converter switching between single and dual phase modes of operation accordance with aspects of the present invention.

FIG. 8 includes graph 802 and a graph 804 of load power 334 of DC-DC converter 300, when switching from a single phase output to a dual phase output. Graph 802 includes a Y-axis 806, an X-axis 808, a current function 810 and a current function 812. Current function 810 includes a single phase portion 814, a decreasing portion 816 and a dual phase portion 818. Current function 812 includes a single phase portion 820, an increasing portion 822 and a dual phase portion 824. Graph 804 includes a Y-axis 826, X-axis 808 and a voltage function 828.

Graph 802 represents the current of load power 334 over time in DC-DC converter 300, whereas graph 804 represents the voltage of load power 334 over time in DC-DC converter 300. Y-axis 806 represents current in Amperes, whereas Y-axis 826 represents voltage in Volts. X-axis 808 represents time in seconds.

Current function 810 corresponds to power signal 330 of power stage 306, as shown in FIG. 3. Single phase portion 814 has a current of 1.0 A, and stops prior time $t_1$. Decreasing portion 816 is a stepped function that decreases in eight increments from 1.0 A to 0.5 A from before $t_1$ to $t_4$. Dual phase portion 818 has a current of 0.5 A and continues after time $t_4$.

Current function 812 corresponds to power signal 332 of power stage 308, as shown in FIG. 3. Single phase portion 820 has a current of 0.0 A, and continues prior to time $t_1$. Increasing portion 822 is a stepped function that increases in eight increments from 0.0 A to 0.5 A from before $t_1$ to $t_4$. Dual phase portion 824 has a current of 0.5 A and continues after time $t_4$.

Voltage function 828 corresponds to a voltage of load power 334, as shown in FIG. 3, over time. Voltage function 828 includes a plurality of alternating transients and smooth portions 830 that represents a voltage change when switching power transfer modes.

In this example, because the stepwise change is smaller than that discussed above with reference to FIG. 4, the corresponding transient is much smaller. As such, controller 302 need not spend as much processing time to control the transients.

In other words, in accordance with another aspect of the present invention, the number of steps in the stepwise change of the output voltages of the power stages may be modified to manage the size of voltage transients. It should be noted that the four and eight step examples are non-limiting examples, wherein a DC-DC converter in accordance with aspects of the present invention may include an up/down counter that provides for any number of steps.

In the example embodiments discussed above, the period between steps and the number of steps are predetermined for a particular DC-DC converter. However in other embodiments, the number of steps and/or the period between steps may be modified as needed to minimize the time period between outputs states and minimize voltage transients. This will be described in greater detail with reference to FIGS. 9-10.

Figure 9:
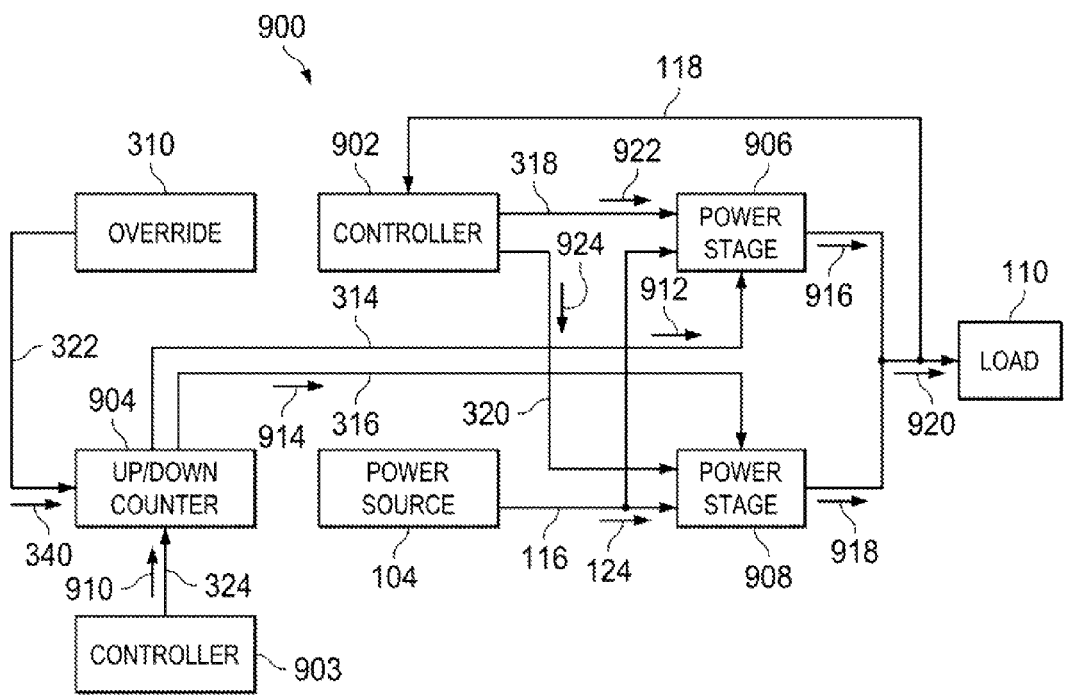
FIG. 9 illustrates another example DC-DC converter in accordance with aspects of the present invention.

FIG. 9 illustrates an example DC-DC converter 900 in accordance with aspects of the present invention.

As illustrated in the figure, DC-DC converter 900 includes controller 302, a controller 903, a digital up/down counter 904, power source 104, a power state 906, a power stage 908, override component 310 and load 110.

In this example, controller 302, controller 903, up/down counter 904, power stage 906, power stage 908, power source 104, override component 310 and load 110 are illustrated as individual devices. However, in some embodiments, at least two of controller 302, controller 903, up/down counter 904, power stage 906, power stage 908, power source 104, override component 310 and load 110 may be combined as a unitary device. Further, in some embodiments, at least one of controller 302, controller 903, up/down counter 904, power stage 906, power stage 908, power source 104, override component 310 and load 110 may be implemented as a computer having tangible computer-readable media for carrying or having computer-executable instructions or data structures stored thereon.

Controller 903 differs from controller 303 in that controller 903 is able to determine the number of steps and the period between steps to be provided by up/down counter 904. Further, controller 903 outputs a control signal 910 to up/down counter 904.

Up/down counter 904 differs from up/down counter 304 in that up/down counter is able to provide instructions for stepwise increments and decrements, wherein the steps are of varied magnitude and varied periods. Further, up/down counter 904 outputs a control signal 912 to power stage 906 and outputs a control signal 914 to power stage 908.

Power stage 906 and power stage 908 differ from power stage 306 and power stage 308, respectively, in that power stage 906 and power stage 908 are able to output power signals based on instructions from up/down counter 904. Power stage outputs power signal 916, whereas power stage 908 outputs power signal 918. Power signal 916 and power signal 918 add to make load power 920 for load 110 and controller 302.

In this embodiment, controller 903 is able to determine the optimized step period and step amplitude, on a step-by-step basis for up/down counter 904 in order to minimize output phase switching time, while keeping voltage transients below a predetermined acceptable threshold. This will be described in greater detail with reference to FIG. 10.

Figure 10:
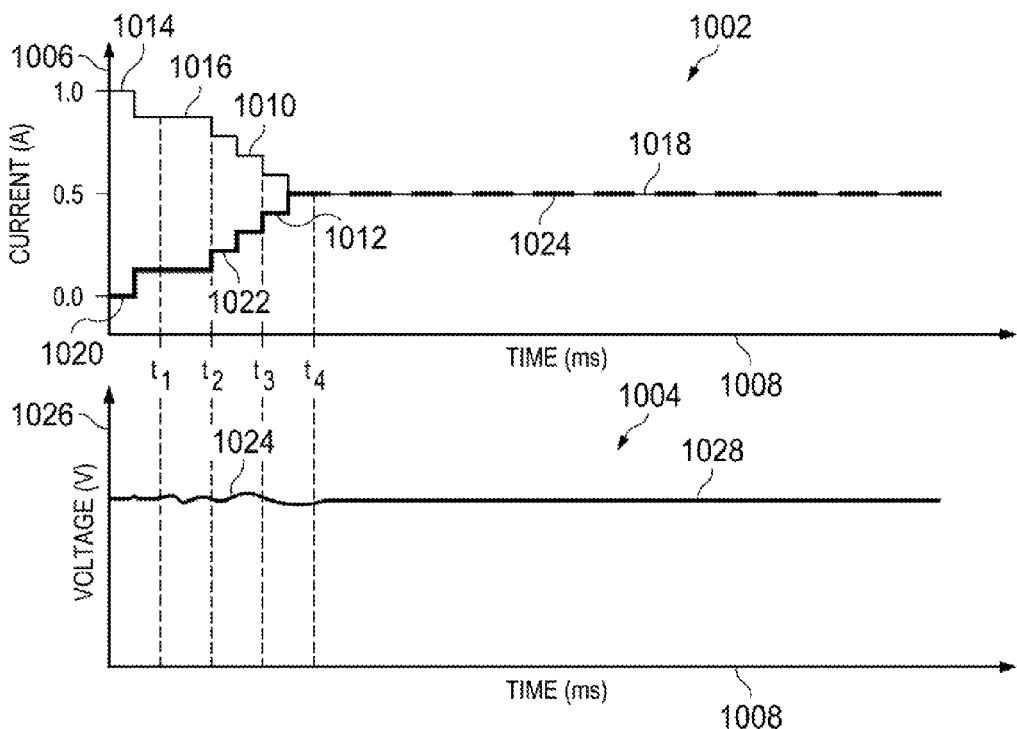
FIG. 10 illustrates additional graphs of voltage and current in an example DC-DC converter switching between single and dual phase modes of operation accordance with aspects of the present invention.

FIG. 10 includes graph 1002 and a graph 1004 of load power 920 of DC-DC converter 900, when switching from a single phase output to a dual phase output. Graph 1002 includes a Y-axis 1006, an X-axis 1008, a current function 1010 and a current function 1012. Current function 1010 includes a single phase portion 1014, a decreasing portion 1016 and a dual phase portion 1018. Current function 1012 includes a single phase portion 1020, an increasing portion 1022 and a dual phase portion 1024. Graph 1004 includes a Y-axis 1026, X-axis 1008 and a voltage function 1028.

Graph 1002 represents the current of load power 920 over time in DC-DC converter 900, whereas graph 1004 represents the voltage of load power 920 over time in DC-DC converter 900. Y-axis 1006 represents current in Amperes, whereas Y-axis 1026 represents voltage in Volts. X-axis 1008 represents time in ms.

Current function 1010 corresponds to power signal 916 of power stage 906, as shown in FIG. 9. Single phase portion 1014 has a current of 1.0 A, and stops prior time $t_1$. Decreasing portion 1016 is a stepped function that decreases in six varying increments from 1.0 A to 0.5 A from before $t_1$ to before $t_4$. Dual phase portion 1018 has a current of 0.5 A.

Current function 1012 corresponds to power signal 918 of power stage 908, as shown in FIG. 9. Single phase portion 1020 has a current of 0.0 A, and continues prior to time $t_1$. Increasing portion 1022 is a stepped function that increases in six varying increments from 1.0 A to 0.5 A from before $t_1$ to before $t_4$. Dual phase portion 1024 has a current of 0.5 A.

Voltage function 1028 corresponds to a voltage of load power 920, as shown in FIG. 9, over time. Voltage function 1028 includes a plurality of alternating transients and smooth portions 1024 that represents a voltage change when switching power transfer modes.

In this example, because each stepwise change is determined to minimize overall switching time from single phase to dual phase, while minimizing transient amplitude. As such, controller 302 need not spend as much processing time to control the transients, and the total time for switching is minimized.

In other words, in accordance with another aspect of the present invention, the number of steps in the stepwise change of the output voltages of the power stages may be modified and the height of each stepwise change of the output voltages of the power stages may be modified to manage the size of voltage transients.

In the example embodiment discussed above, a two-phase DC-DC converter is transitioned from a single phase to a dual phase operation (or vice versa), wherein in the dual phase of operation, both power stages provide an equal amount of power. It should be noted that this is provided merely for purposes of discussion. There may be instances where the two stages provide unequal amounts of power. In this manner, an up/down counter may only step one power stage up a predetermined number of steps and step the second power stage down the same number of steps. As such, the DC-DC converter may be able to operate in any intermediate point between the two phases discussed above.

In another example embodiment, a DC-DC converter may have any number of phases. A DC-DC converter may be able to transfer between single phase, dual phase, or triple phase mode. The process of switching from triple phase mode to single phase mode would be the same as described above. The DC-DC converter would gradually step up the current output of the master power stage while simultaneously stepping down the current output of the two slave phases.

A DC-DC converter in accordance with aspects of the present invention may operate in single phase mode or dual phase mode n. In other example embodiments any number of phases may be used in the masters/slave configuration. In another example embodiment a single master power stage may be used with 4 slave power stages. An increase in the current output of the master power stage may result in a decrease in current of any number of the slave power stages in order to maintain a constant output. A decrease in the current output of the master power stage may result in an increase in the current of any number of the slave power stages needed to maintain a constant output.

A problem with the current system and method for the operation of a conventional DC-DC converter is that a transient is created in the output voltage during the switching of power transfer modes. The transient in the output voltage during the transition from two different transfer modes must be corrected and compensated for by a regulation loop. The transient in the voltage output takes a relatively long time to correct due to the limited bandwidth of the regulation loop of conventional DC-DC converters.

The present invention provides a system and method for creating a smooth transition between transfer modes by using a DAC in the control path of each output power stage. Each DAC can be controlled in a master-slave configuration. In the master slave configuration, when the control signal of the power stage which is being turned off is gradually reduced while the power stage that is being turned up is gradually increased.

In this manner the total output of the DC-DC converter is kept constant over time. The purpose of multiple DAC's is to individually attenuate or amplify the control current of each output power stage. Transients may still be created in a DC-DC converter operating in accordance with aspects of the present invention, but their magnitudes will be much smaller. Since the full transition process takes place with a few ms and the transients are much smaller, the voltage regulation loop of the DC-DC converter has enough time to compensate for small errors or non-linearity's in the transfer function.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A DCDC converter comprising:
   a controller operable to generate an up/down control signal;
   an up/down counter operable to generate a first power stage control signal and a second power stage control signal based on the up/down control signal;
   a first power stage operable to generate a first output current at a first phase and at a first voltage based on the first power stage control signal;
   a second power stage operable to generate a second output current at a second phase based on the second power stage control signal;
   wherein said up/down counter is a digital counter operable to modify the first power stage control signal to control said first power stage such that the first output current changes stepwise in a plurality of steps controlled by the digital counter in one of increasing or decreasing output current;
   and said up/down counter is operable to modify the second power stage control signal to control said second power stage such that the output current changes stepwise by a same amount in another of increasing or decreasing output current.

2. The DCDC converter of claim 1,
   wherein said up/down counter is operable to generate the first power stage control signal as a stepwise increasing digital counting signal, and
   wherein said controller is operable to generate the up/down control signal so as to control the period of steps in the stepwise increasing digital counting signal.

3. The DCDC converter of claim 1,
   wherein said up/down counter is operable to generate the first power stage control signal as a stepwise increasing digital counting signal, and
   wherein said controller is operable to generate the up/down control signal so as to control the period of steps in the stepwise increasing digital counting signal.

4. A DCDC converter comprising:
   a controller operable to generate an up/down control signal;
   an up/down counter operable to generate a first power stage control signal and a second power stage control signal based on the up/down control signal;
   a first power stage operable to generate a first output current at a first phase and at a first voltage based on the first power stage control signal;
   a second power stage operable to generate a second output current at a second phase based on the second power stage control signal;
   wherein said up/down counter is operable to modify the first power stage control signal to control said first power stage such that the first output current attenuates from a first power stage output to a secondary first power stage output,
   wherein said controller is further operable to output a control signal to modify the first voltage of said first power stage,
   wherein said digital up/down counter is operable to output one of an increasing digital counting signal and a decreasing digital counting signal,
   wherein said first power stage is operable to decrease the first output current based on the increasing digital counting signal,
   wherein said second power stage is operable to increase the second output current based on the increasing digital counting signal, wherein said controller is operable to output the control signal based on a sum of the first output current and the second output current, wherein said first power stage is operable to increase the first output current based on the decreasing digital counting signal, wherein said second power stage is operable to decrease the second output current based on the decreasing digital counting signal, wherein the output current ≥the first output current ≥0.5*the output current, and wherein 0.5*the output current ≥the second output current ≥0, wherein said up/down counter is operable to generate the first power stage control signal as a stepwise increasing digital counting signal, wherein said controller is operable to generate the up/down control signal so as to control the number of steps in the stepwise increasing digital counting signal.

5. The DC/DC converter of claim 4, further comprising:
an override component operable to generate an override signal, wherein said digital up/down counter is further operable to output a maximum digital counting signal based on the override signal, and wherein said second power stage is further operable to output no second output current based on the maximum digital counting signal.

6. The DCDC converter of claim 5, wherein said controller is operable to generate the up/down control signal so as to additionally control the period of steps in the stepwise increasing digital counting signal.

7. The DCDC converter of claim 4, wherein said controller is operable to generate the up/down control signal so as to additionally control the period of steps in the stepwise increasing digital counting signal.

8. A method comprising:
generating, via a controller, an up/down control signal;
generating, via a digital up/down counter, a first power stage control signal based on the up/down control signal;
generating, via the up/down counter, a second power stage control signal based on the up/down control signal;
generating, via a first power stage, a first output current at a first phase and at a first voltage based on the first power stage control signal;
generating, via a second power stage, a second output current at a second phase based on the second power stage control signal;
modifying, via the up/down counter, the first power stage control signal to control the first power stage such that the first output current changes stepwise in a plurality of steps controlled by the digital counter in one of increasing or decreasing output current;
and said up/down counter is operable to modify the second power stage control signal to control said second power stage such that the output current changes stepwise by a same amount in another of increasing or decreasing output current; and outputting, via the controller, a control signal to modify the first voltage of the first power stage.

9. A method comprising:
generating, via a controller, an up/down control signal;
generating, via an up/down counter, a first power stage control signal based on the up/down control signal;
generating, via the up/down counter, a second power stage control signal based on the up/down control signal;
generating, via a first power stage, a first output current at a first phase and at a first voltage based on the first power stage control signal;
generating, via a second power stage, a second output current at a second phase based on the second power stage control signal;
modifying, via the up/down counter, the first power stage control signal to control the first power stage such that the first output current attenuates from a first power stage output to a secondary first power stage output; and
outputting, via the controller, a control signal to modify the first voltage of the first power stage;

wherein said generating, via an up/down counter, a first power stage control signal based on the up/down control signal comprises generating the first power stage control signal as one of an increasing digital counting signal and a decreasing digital counting signal, wherein said generating, via a first power stage, a first output current at a first phase and at a first voltage based on the first power stage control signal comprises decreasing the first output current based on the increasing digital counting signal, wherein said generating, via a second power stage, a second output current at a second phase based on the second power stage control signal comprises increasing the second output current based on the increasing digital counting signal, wherein said outputting, via the controller, a control signal to modify the first voltage of the first power stage comprises outputting the control signal based on a sum of the first output current and the second output current, wherein the output current ≥the first output current ≥0.5*the output current, and wherein 0.5*the output current ≥the second output current ≥0, wherein said generating, via an up/down counter, a first power stage control signal based on the up/down control signal comprises generating the first power stage control signal as a stepwise increasing digital counting signal, and wherein said generating, via a controller, an up/down control signal comprises generating the up/down control signal so as to control the number of steps in the stepwise increasing digital counting signal.

10. The method of claim 9, further comprising:
generating, via an override component, generate an override signal, outputting, via the digital up/down counter, a maximum digital counting signal based on the override signal.

11. The method of claim 10, wherein said generating, via a controller, an up/down control signal comprises generating the up/down control signal so as to additionally control the period of steps in the stepwise increasing digital counting signal.

12. The method of claim 9, wherein said generating, via a controller, an up/down control signal comprises generating the up/down control signal so as to additionally control the period of steps in the stepwise increasing digital counting signal.

13. The method of claim 9,
wherein generating, via an up/down counter, a first power stage control signal based on the up/down control signal comprises generating the first power stage control signal as a stepwise increasing digital counting signal, and wherein said generating, via a controller, an up/down control signal comprises generating the up/down control signal so as to control the period of steps in the stepwise increasing digital counting signal.

14. The method of claim 9,
wherein generating, via an up/down counter, a first power stage control signal based on the up/down control signal comprises generating the first power stage control signal as a stepwise increasing digital counting signal, and
wherein said generating, via a controller, an up/down control signal comprises generating the up/down control signal so as to control the period of steps in the stepwise increasing digital counting signal.

* * * * *